US012759283B2

(12) United States Patent
Chen

(10) Patent No.: US 12,759,283 B2
(45) Date of Patent: Oct. 13, 2026

(54) INK CHAMBER FRAME STRUCTURE AND INK CHAMBER DEVICE WITH INK RETURN FUNCTION

(71) Applicant: SUNRISE PACIFIC CO., LTD., Taoyuan City (TW)

(72) Inventor: Chih-Wang Chen, Taoyuan City (TW)

(73) Assignee: SUNRISE PACIFIC CO., LTD., Taoyuan City (TW)

( * ) Notice: Subject to any disclaimer, the term of this patent is extended or adjusted under 35 U.S.C. 154(b) by 0 days.

(21) Appl. No.: 19/289,079

(22) Filed: Aug. 3, 2025

(65) Prior Publication Data

US 2026/0061741 A1 Mar. 5, 2026

(30) Foreign Application Priority Data

Aug. 30, 2024 (TW) ................................ 113209416

(51) Int. Cl.
*B41F 31/20* (2006.01)
*B41F 31/02* (2006.01)
*B41F 31/26* (2006.01)

(52) U.S. Cl.
CPC ............ *B41F 31/20* (2013.01); *B41F 31/022* (2013.01); *B41F 31/26* (2013.01)

(58) Field of Classification Search
CPC ........ B41F 31/027; B41F 31/04; B41F 31/06; B41F 31/07; B41F 31/08; B41F 31/10; B41F 31/20; B41F 31/022; B41F 31/26; B41F 33/14; B41F 35/00; B41F 35/04; B41P 2235/26; B41P 2235/2251; B41P 2235/10
See application file for complete search history.

(56) References Cited

U.S. PATENT DOCUMENTS 4,581,995 A * 4/1986 Stone .................... B41F 31/027 101/366
2010/0319558 A1* 12/2010 Hasselmann ......... B41F 31/027 101/157

FOREIGN PATENT DOCUMENTS

CN 108556478 A * 9/2018 .............. B41F 31/04
EP 2749358 A1 * 7/2014 ............... F17D 3/01
JP 2000246876 A * 9/2000

* cited by examiner

*Primary Examiner* — Christopher E Mahoney
*Assistant Examiner* — Marissa Ferguson-Samreth

(57) ABSTRACT

An ink chamber frame structure includes an ink chamber frame including a lower ink chamber frame component and an ink shield having a lower side connected to the lower ink chamber frame component and a front surface provided with an ink roller with left and right ends thereof corresponding to the left and right ends of the ink shield, two first ink stopper blocks placed on the front surface of the ink shield, and a lower scraper installed on the lower ink chamber frame component and incorporated with the ink shield, the ink stopper blocks and the ink roller to form an ink chamber. when the ink roller is in use, the ink accumulated in the ink chamber will only accumulate to the height of the two first ink stopper blocks, and will not accumulate to the entire ink chamber.

9 Claims, 10 Drawing Sheets

INK CHAMBER FRAME STRUCTURE AND INK CHAMBER DEVICE WITH INK RETURN FUNCTION

BACKGROUND OF THE INVENTION

1. Field of the Invention

The present invention relates to ink chamber frame structure and ink chamber device with ink return function, particularly an ink chamber frame structure capable of reducing ink overflow from both sides of the roller.

2. Description of the Related Art

The general ink chamber frame structure is combined with an ink roller to form an ink chamber device. The ink chamber frame structure is composed of an ink shield, an upper scraper, a lower scraper, and two ink stopper blocks located on the left and right sides of the ink shield. The ink shield, upper scraper, lower scraper and two ink stopper blocks in the ink chamber frame structure together with the ink roller will form an ink chamber device with a closed ink chamber. When the ink chamber device is operating, the ink will fill the entire ink chamber, so that when the ink roller rolls, the ink can be evenly applied to the surface of the ink roller. Because the two ink stopper blocks on both sides of the ink shield will be slowly worn away as the ink roller rolls, causing gaps between the two ink stopper blocks and the ink roller. Therefore, if the ink stopper blocks of the ink chamber device are not replaced regularly, the ink stopper blocks will be worn out, causing the ink in the ink chamber to spray out from the gaps between the two ink stopper blocks and the ink roller, and the ink will be sprayed everywhere around, polluting the surrounding environment. The ink is difficult to clean. Therefore, when ink spraying occurs in the ink chamber, the printing manufacturer must spend a lot of extra time and manpower costs to clean it.

SUMMARY OF THE INVENTION

The present invention provides an ink chamber frame structure, which is used to be combined with an ink roller to form an ink chamber device with an ink return function. The ink chamber frame structure comprises an ink chamber frame, two first ink stopper blocks and a lower scraper. The ink chamber frame comprises an upper ink chamber frame component, a lower ink chamber frame component and an ink shield. The upper side of the ink shield is connected to the upper ink chamber frame component, and the lower side of the ink shield is connected to the lower ink chamber frame component. An ink roller is provided on the front surface of the ink shield of the ink chamber frame. The left and right ends of the ink roller correspond to the left and right ends of the ink shield of the ink chamber frame. The two first ink stopper blocks are disposed on the front surface of the ink shield of the ink chamber frame, and the two first ink stopper blocks are respectively located near the left and right ends of the ink shield and near the lower side of the ink shield. The lower scraper is installed on the lower ink chamber frame component of the ink chamber frame, and an ink chamber is formed together by the lower scraper, the ink shield of the ink chamber frame, the two first ink stopper blocks and the ink roller. In addition, the two first ink stopper blocks are used to block the ink, and the ink chamber frame uses the two first ink stopper blocks as dividing lines to divide the ink chamber into a wiping area and two ink return areas. The wiping area is the area between the two first ink stopper blocks, and the two ink return areas are the areas between the left and right ends of the ink shield and the two first ink stopper blocks. The wiping area is used to accumulate ink. After the ink accumulation exceeds the height of the two tops of the two first ink stopper blocks, the ink will flow over the two tops of the two first ink stopper blocks and flow to the two ink return areas to be recycled to avoid ink accumulation in the entire ink chamber, so that when the ink roller is in use, there will be no ink overflow between the left and right ends of the ink roller and the left and right ends of the ink shield of the ink chamber frame.

DETAILED DESCRIPTION OF THE PREFERRED EMBODIMENT

Figure 1:
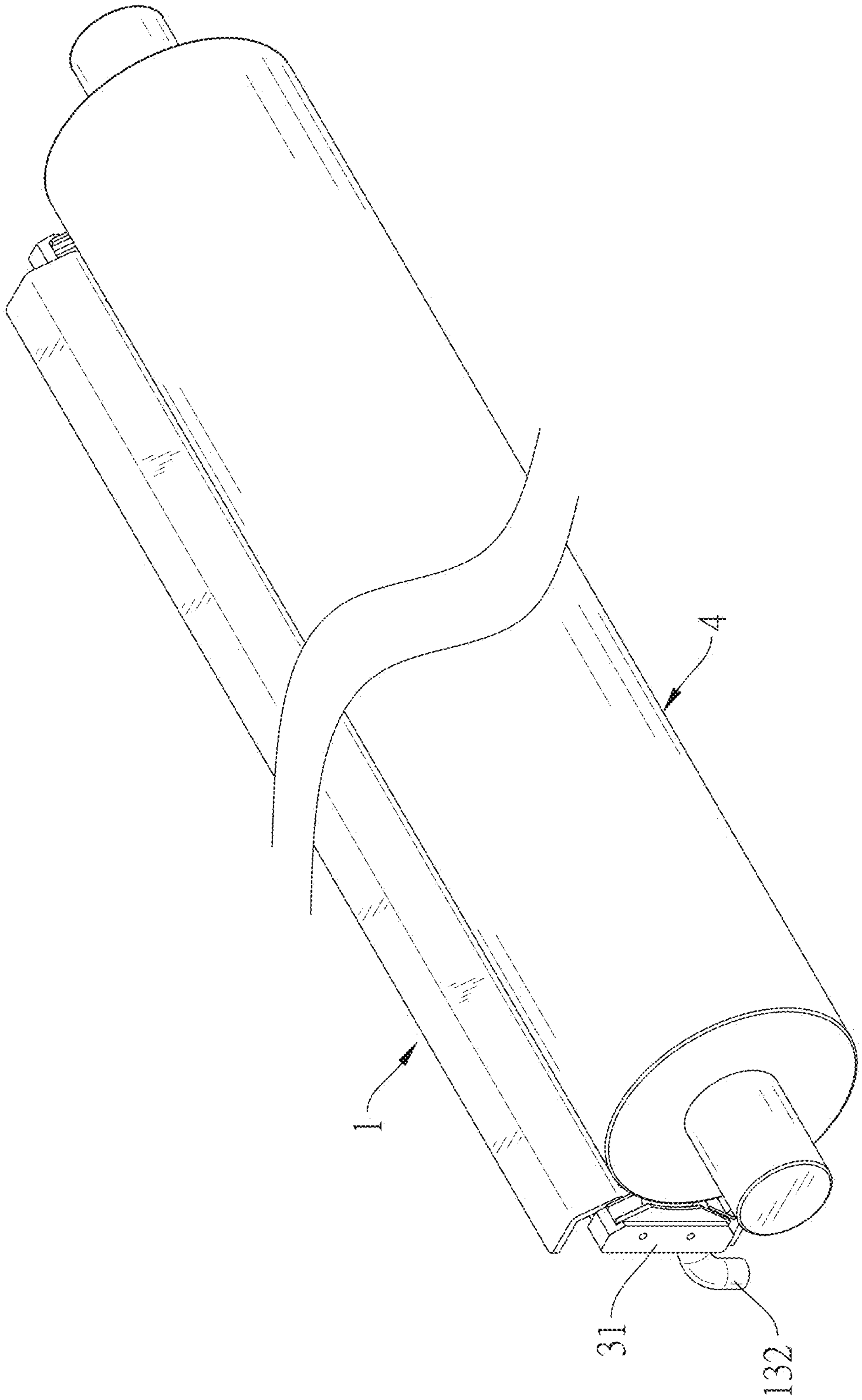
FIG. 1 is an overall schematic diagram of the ink chamber device of the present invention.
Figure 2:
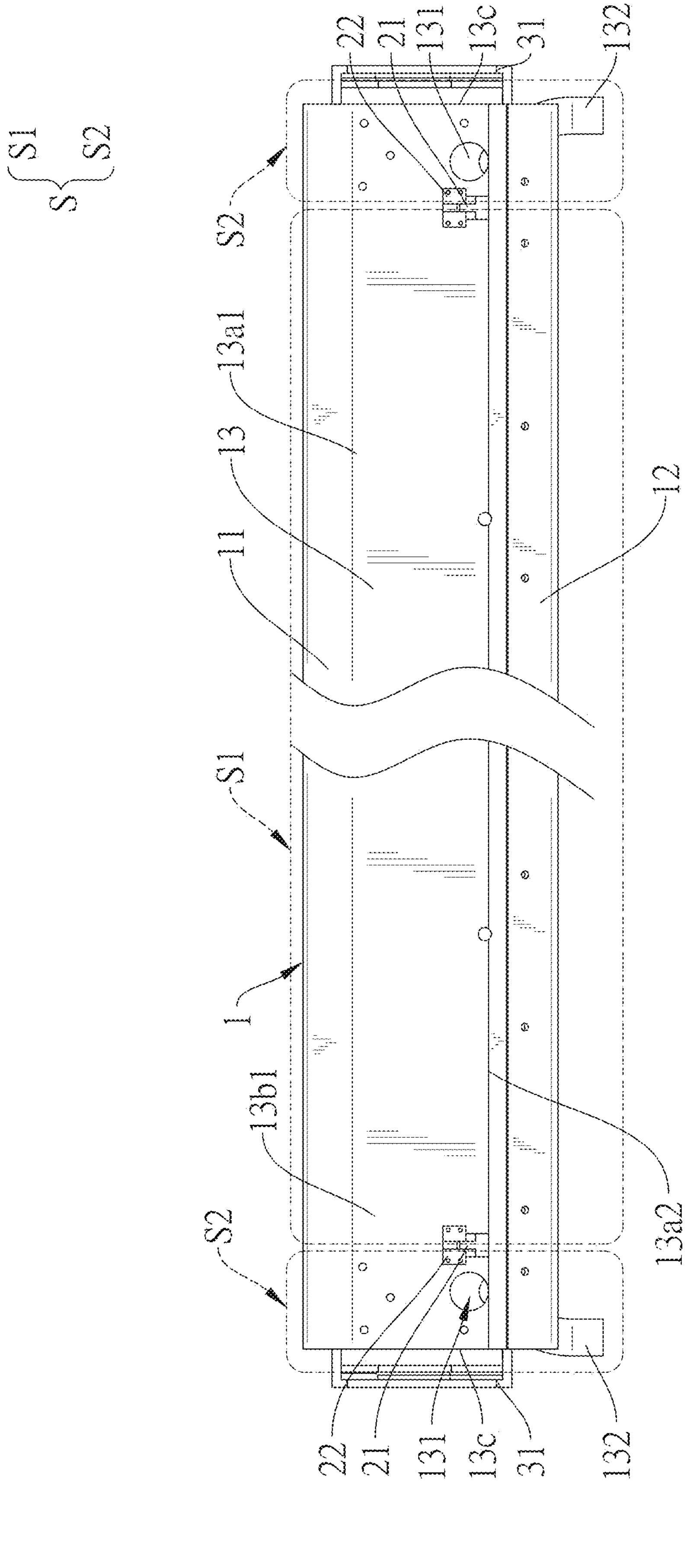
FIG. 2 is a front view of the ink chamber frame of the ink chamber frame structure of this invention.
Figure 3:
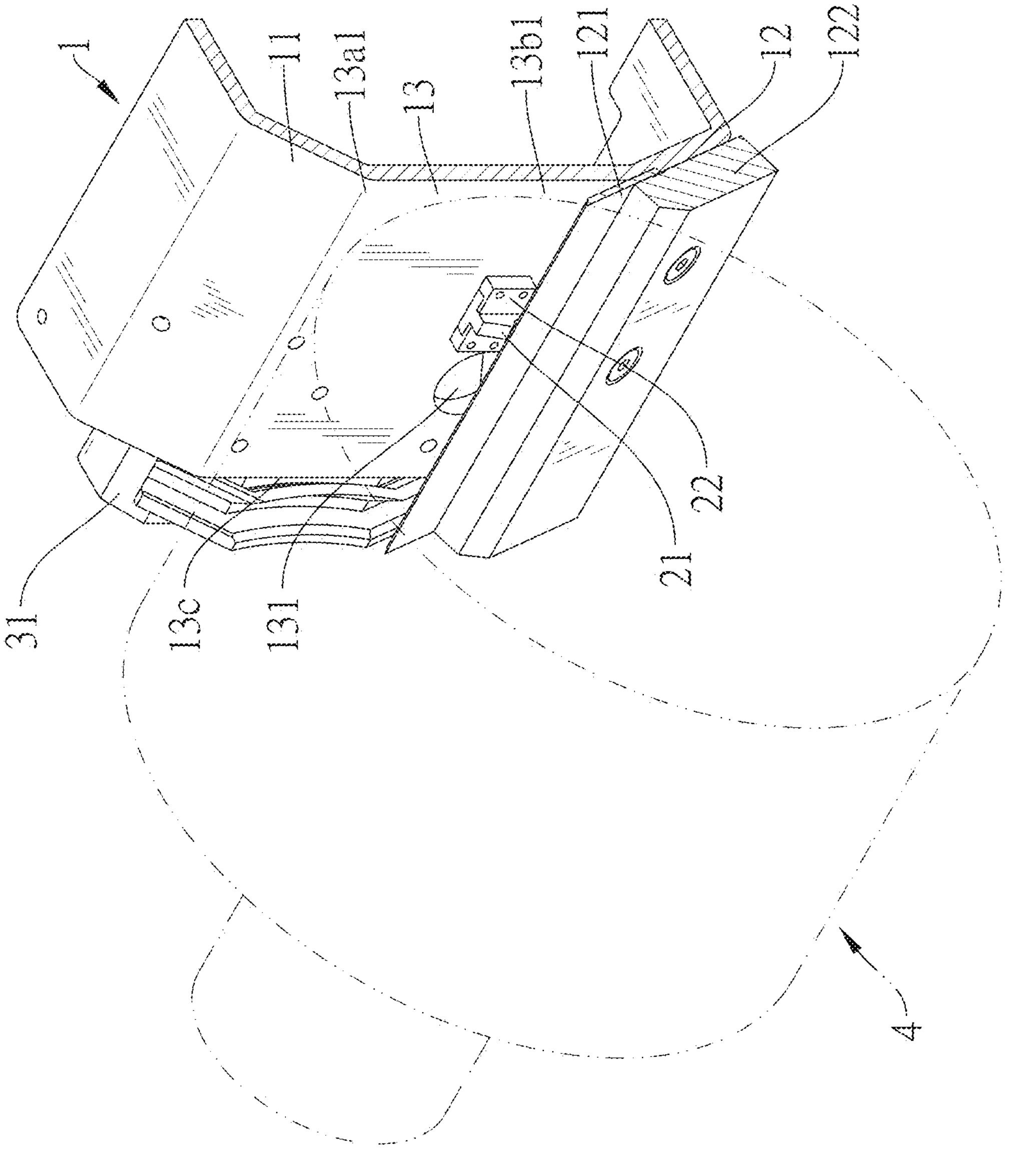
FIG. 3 is a schematic diagram showing the contact between the lower scraper and the first ink stopper blocks and the ink roller of the ink chamber frame structure of the present invention.
Figure 4:
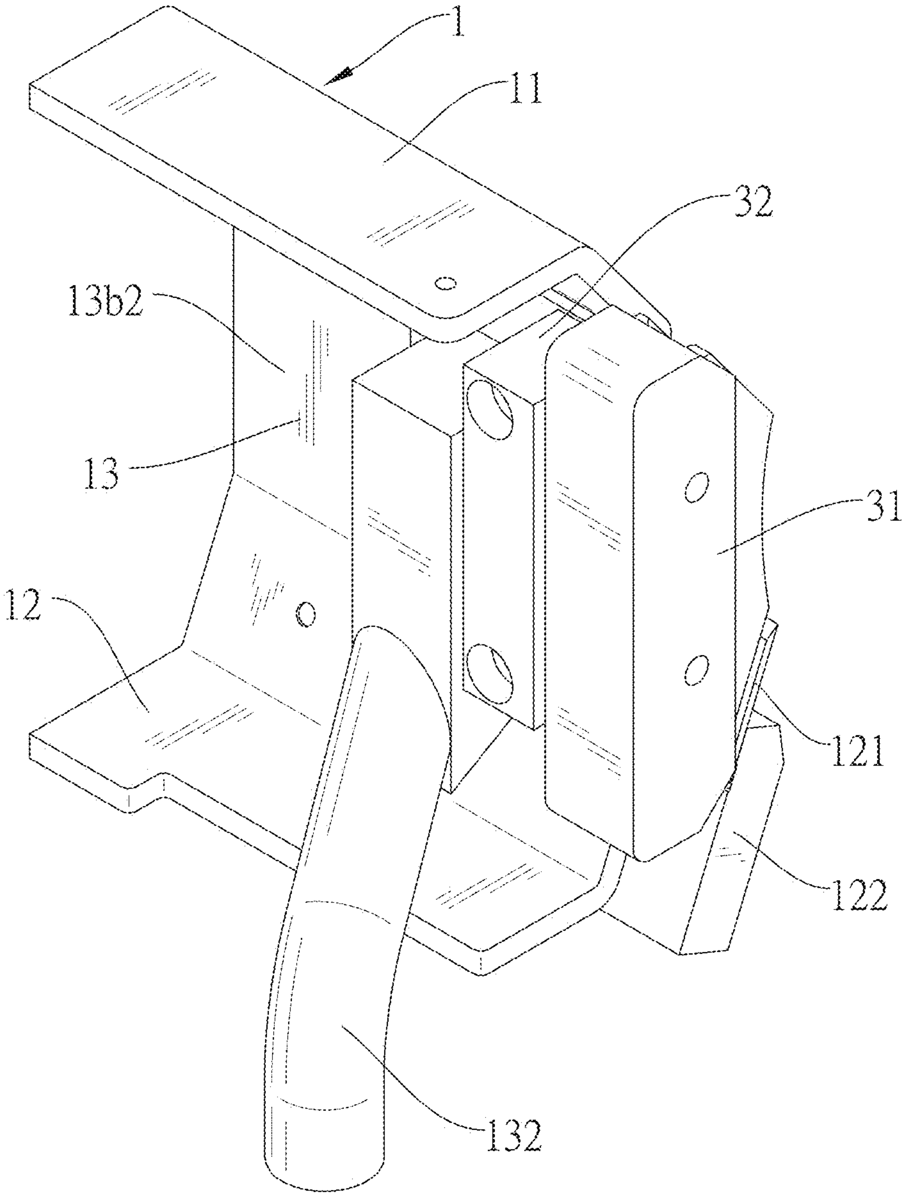
FIG. 4 is a partial rear view of the ink chamber frame of the ink chamber frame structure of the present invention.

Please refer to FIG. 1, FIG. 2, FIG. 3, FIG. 5 and FIG. 7, the ink chamber frame structure, referenced by 100, is used to be combined with an ink roller 4 to form an ink chamber device with an ink return function. The ink chamber frame structure 100 comprises an ink chamber frame 1, two first ink stopper blocks 21, and a lower scraper 121. The ink chamber frame 1 comprises an upper ink chamber frame 11, a lower ink chamber frame 12, and an ink shield 13 formed integrally. The upper ink chamber frame component 11 is connected to the upper side **13*al* of the ink shield 13, and the lower ink chamber frame component 12 is connected to the lower side 13*a*2 of the ink shield 13. The ink roller 4 is provided adjacent to the front surface 13*b*1 of the ink shield 13 of the ink chamber frame 1, that is, at the front side of the entire ink chamber frame structure 100. The ink roller 4 is separated from the front surface 13*b*1 of the ink shield 13 of the ink chamber frame 1 by a distance and does not contact the front surface 13*b*1 of the ink shield 13 of the ink chamber frame 1, and the left and right ends of the ink roller 4 correspond to the left and right ends 13***c* of the ink shield 13 of the ink chamber frame 1.

Two first ink stopper blocks 21 and two first ink stopper block brackets 22 are provided on the front surface 13*b*1 of the ink shield 13 of the ink chamber frame 1. The two first ink stopper blocks 21 and the two first ink stopper block brackets 22 are respectively located near the left and right ends 13*c* of the ink shield 13 and near the lower side 13*a*2 of the ink shield 13, and the two first ink stopper blocks 21 are detachably engaged with the two first ink stopper block brackets 22.

Figure 5:
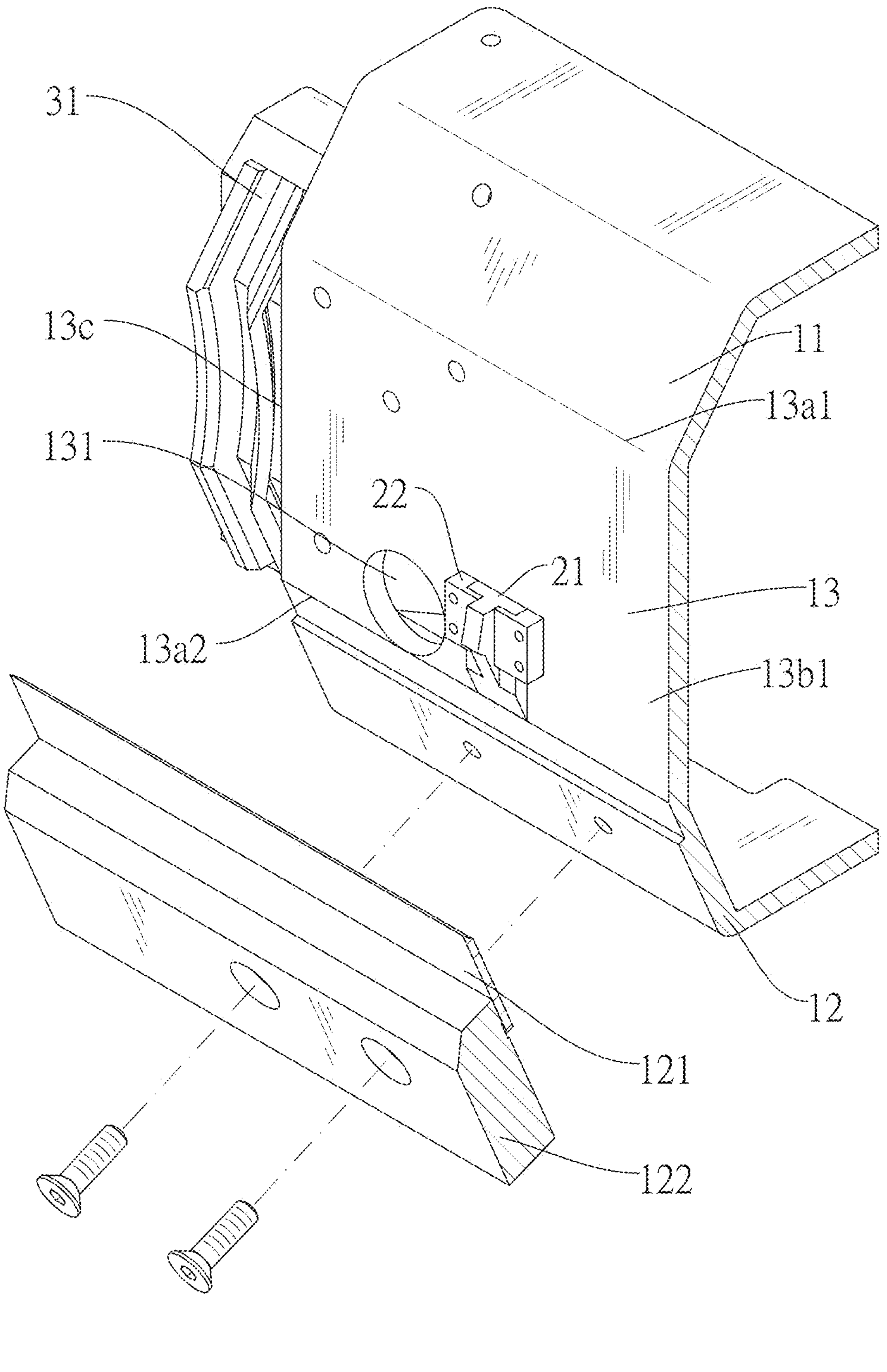
FIG. 5 is a schematic diagram showing the lower scraper of the ink chamber frame structure of the present invention installed on the ink chamber frame.
Figure 6:
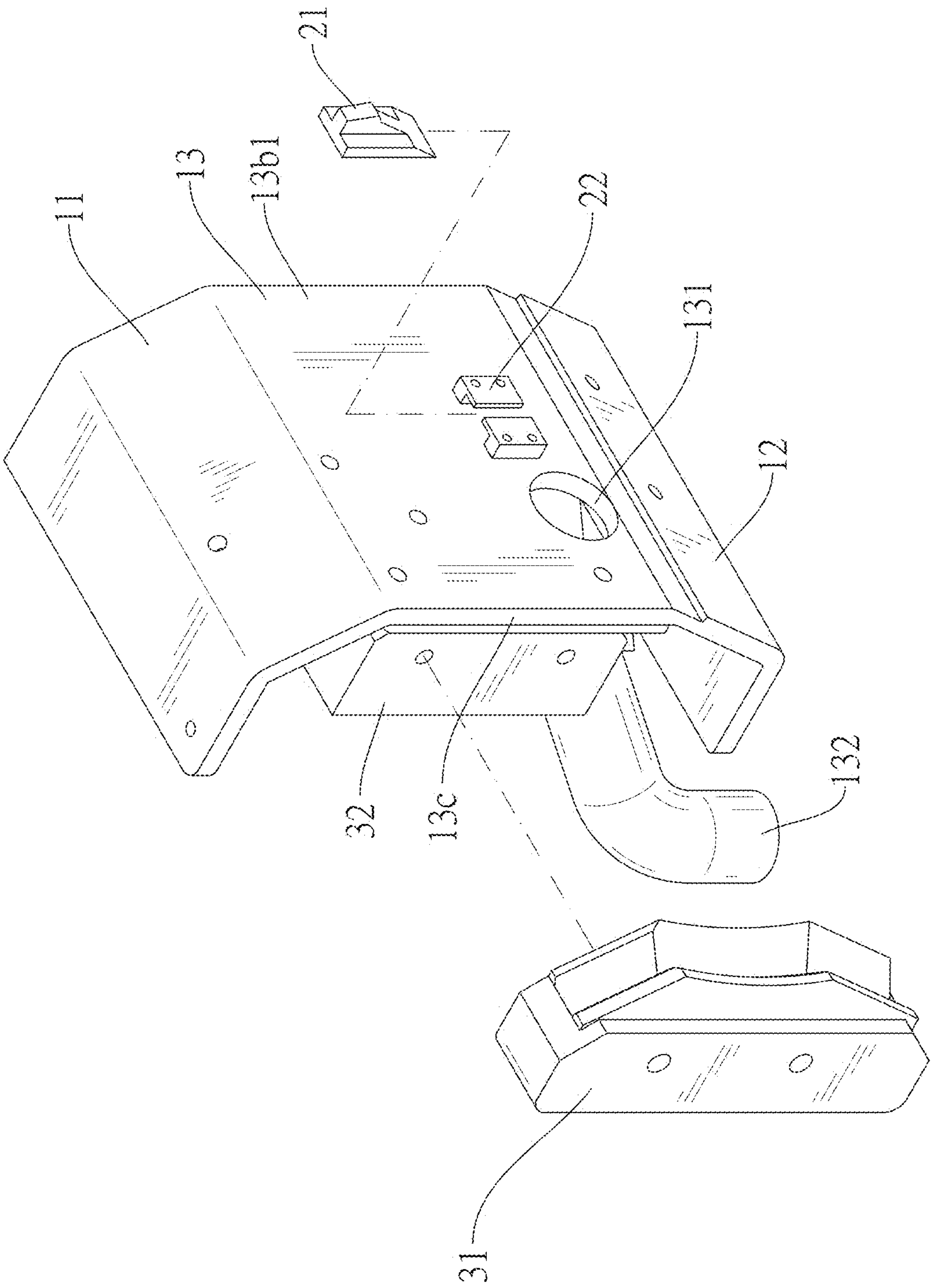
FIG. 6 is a schematic diagram showing the first ink stopper blocks and the second ink stopper blocks of the ink chamber frame structure of the present invention being installed on the ink chamber frame.
Figure 7:
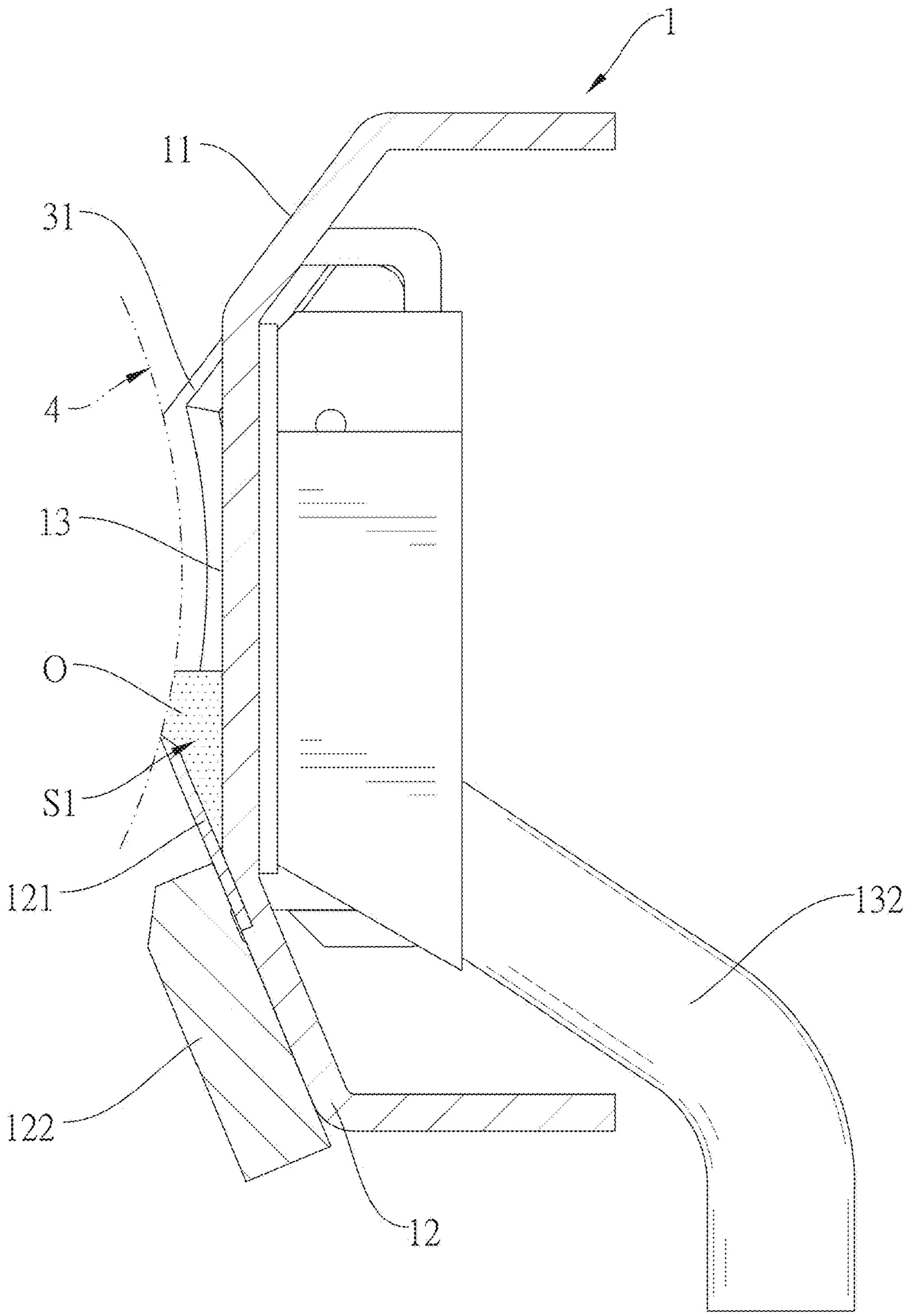
FIG. 7 is a side cross-sectional view of the ink chamber device of the first embodiment of the present invention.

Next, as shown in FIG. 1 and FIG. 5, the lower scraper 121 is provided at the position of the lower ink chamber frame component 12 of the ink chamber frame 1. The lower scraper 121 is locked on the lower ink chamber frame component 12 of the ink chamber frame 1 through a lower scraper holder 122 and a plurality of fixing elements. In this invention, an ink chamber S is formed by the ink shield 13 of the ink chamber frame 1, the lower scraper 121, the two first ink stopper blocks 21 and the ink roller 4. The ink chamber frame 1 uses the positions of the two first ink stopper blocks 21 as dividing lines to divide the ink chamber S into an ink wiping area S1 and two ink return areas S2. The wiping area S1 is an area between the two first ink stopper blocks 21, and the two ink return areas S2 are areas between the left and right ends 13*c* of the ink shield 13 and the two first ink stopper blocks 21.

In addition, there is at least one ink inlet hole on the ink shield 13 of the ink chamber frame 1 and located between the two first ink stopper blocks 21, that is, at the location of the wiping area S1, and the ink inlet hole is connected to the ink inlet tube. Ink return holes 131 are respectively provided on the ink shield 13 of the ink chamber frame 1 and located between the two first ink stopper blocks 21 and the left and right ends 13*c* of the ink shield 13, that is, the positions of the two ink return areas S2. Each ink return hole 131 is connected to a respective ink return tube 132, and the ink inlet tube and the ink return tubes are connected to a circulation device.

Figure 8:
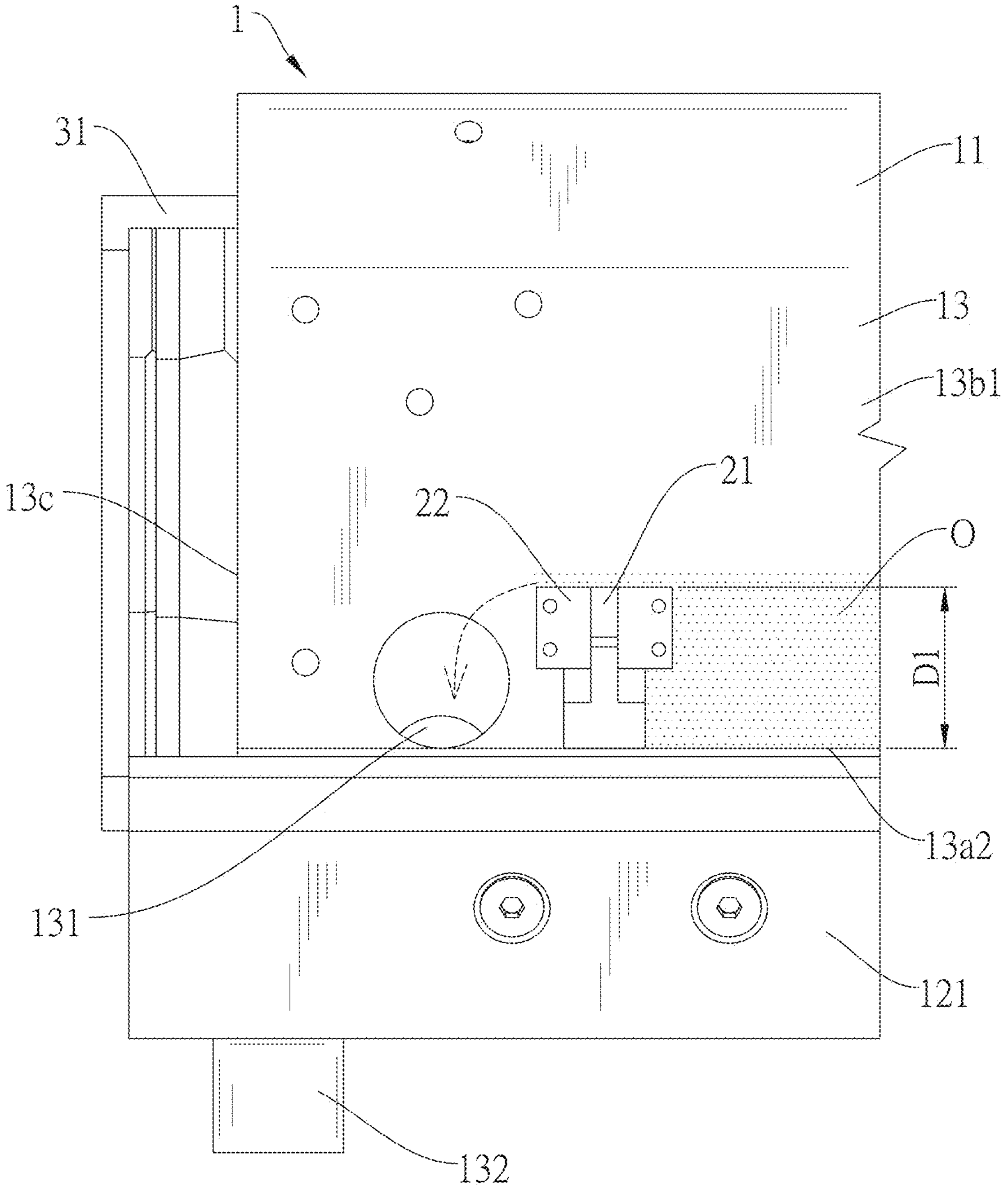
FIG. 8 is a schematic diagram showing the ink in an ink chamber device of the first embodiment of the present invention flowing over the first ink stopper blocks to ink return holes.

Please refer to FIG. 8, the two first ink stopper blocks 21 are completely in contact with the surface of the ink roller 4 and are used to stop the ink O flowing into the wiping area S1 from flowing directly to the ink return area S2. Therefore, after the circulation device introduces ink O into the wiping area S1 through the ink inlet tube and the ink inlet hole, the ink O will accumulate at the two tops of the two first ink stopper blocks 21 in the wiping area S1, and will not accumulate in the entire ink chamber S. Then, the excess ink O flows over the two tops of the two first ink stopper blocks 21 to the two ink return areas S2, and then flows back to the circulation device through the two ink return holes 131 and the ink return tubes 132 connected to the ink return holes 131, thereby achieving the function of recycling the ink O. In addition, the two tops of the two first ink stopper blocks 21 and the lower side 13*a*2 of the ink shield 13 of the ink chamber frame 1 have a first distance D1, and the two bottom ends of the two ink return holes 131 and the lower side 13*a*2 of the ink shield 13 of the ink chamber frame 1 have a second distance, and the second distance is smaller than the first distance D1. Therefore, when the ink O flows from the wiping area S1 over the two tops of the two first ink stopper blocks 21 to the two ink return areas S2, it can naturally flow into the ink return holes 131. The second distance may be zero, that is, the two bottom ends of the two ink return holes 131 are closely attached to the lower side 13*a*2 of the ink shield 13 of the ink chamber frame 1.

In addition, since the two first ink stopper blocks 21 are detachably engaged with the two first ink stopper block brackets 22. When the first ink stopper blocks 21 are worn out due to use, new first ink stopper blocks 21 can be quickly replaced on the first ink stopper block brackets 22. When the two tops of the two first ink stopper blocks 21 and the two tops of the two first ink stopper block brackets 22 are located on the same parallel line, the bottoms of the two first ink stopper blocks 21 are closely attached to the lower side 13*a*2 of the ink shield 13 of the ink chamber frame 1. When the ink O accumulated in the wiping area S1 exceeds the two tops of the two first ink stopper blocks 21, the ink O in the wiping area S1 will flow over the two tops of the two first ink stopper blocks 21 to the ink return holes 131 of the two ink return areas S2.

Figure 9:
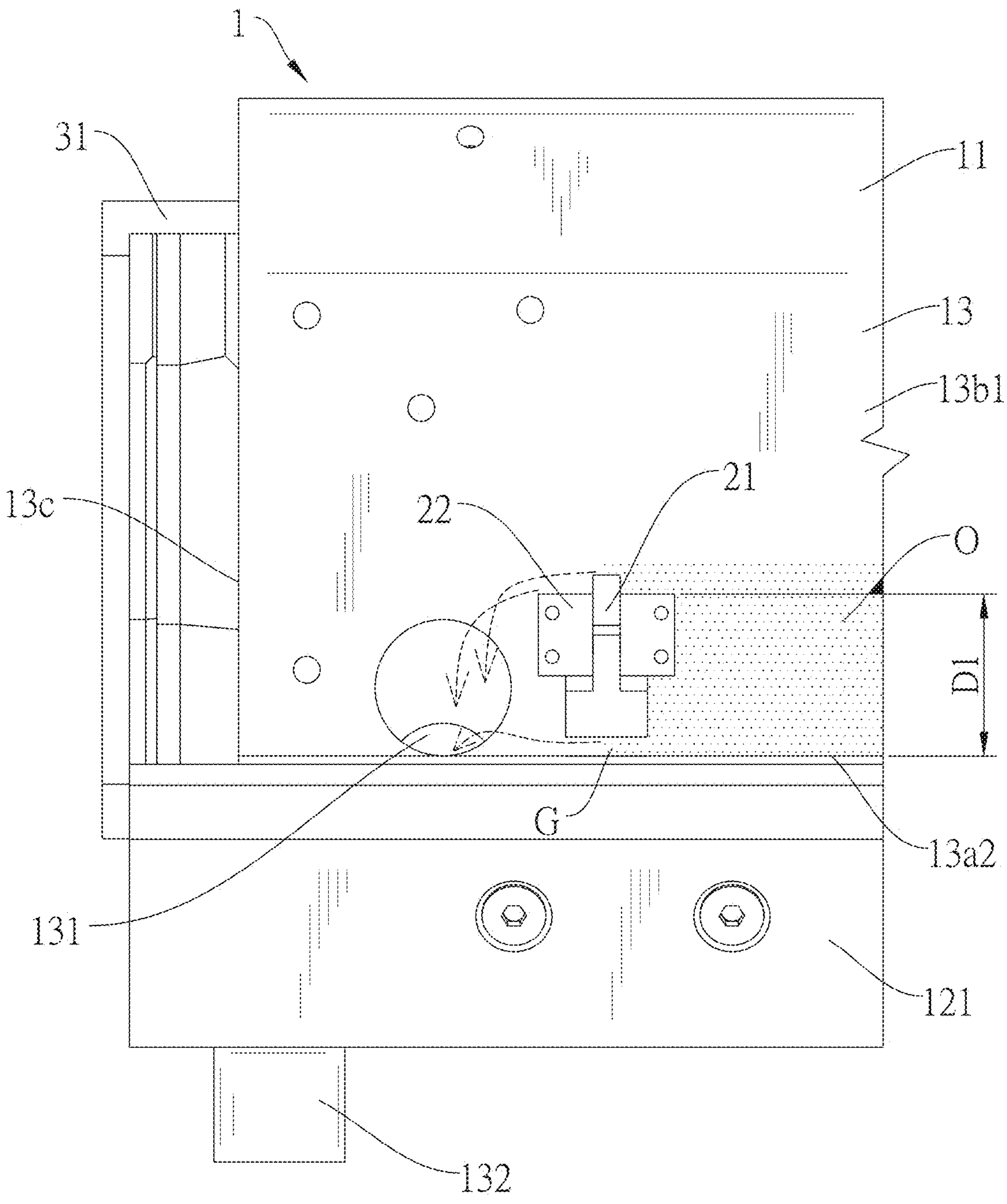
FIG. 9 is a schematic diagram showing the ink in an ink chamber device of the second embodiment of the present invention flowing over the first ink stopper blocks to the ink return holes.

Please refer to FIG. 9, when the two tops of the two first ink stopper blocks 21 are parallel to or higher than the two tops of the two first ink stopper block brackets 22, and a gap G is formed between the two bottoms of the two first ink stopper blocks 21 and the lower side 13*a*2 of the ink shield 13 of the ink chamber frame 1, the gap G allows the ink O accumulated at the bottom of wiping area S1 to flow through, but the speed at which the ink O flows through the gap G is slower than the speed at which the ink inlet hole introduces the ink O into the wiping area S1. Therefore, when the ink O accumulated in the wiping area S1 exceeds the two tops of the two first ink stopper blocks 21, the ink O in the wiping area S1 will not only flow over the two tops of the two first ink stopper blocks 21 to the ink return holes 131 of the two ink return areas S2, but will also flow from the gap G between the two bottoms of the two first ink stopper blocks 21 and the lower side 13*a*2 of the ink shield 13 to the two ink return areas S2. The ink O in the wiping area S1 flows out from the gap G between the two bottoms of the two first ink stopper blocks 21 and the lower side 13*a*2 of the ink shield 13, so that the ink O will not be deposited at the bottom of the wiping area S1.

The left and right ends 13*c* of the ink shield 13 of the ink chamber frame 1 are further provided with two second ink stopper blocks 31 respectively, and the rear surfaces 13*b*2 of the left and right ends 13*c* of the ink shield 13 respectively have two second ink stopper block brackets 32, and the second ink stopper block brackets 32 are used for fixing the second ink stopper blocks 31 on the ink chamber frame 1. The two second ink stopper blocks 31 will completely fit the surface of the ink roller 4, so that when the ink roller 4 rolls, even if part of the ink O does not flow into the ink return holes 131 during the process of the ink O flowing from the wiping area S1 to the ink return areas S2, the two second ink stopper blocks 31 and the left and right ends of the ink roller 4 will block the ink O, so that the ink O will not overflow between the left and right ends of the ink roller 4 and the two second ink stopper blocks 31 and dirty the surrounding environment.

Figure 10:
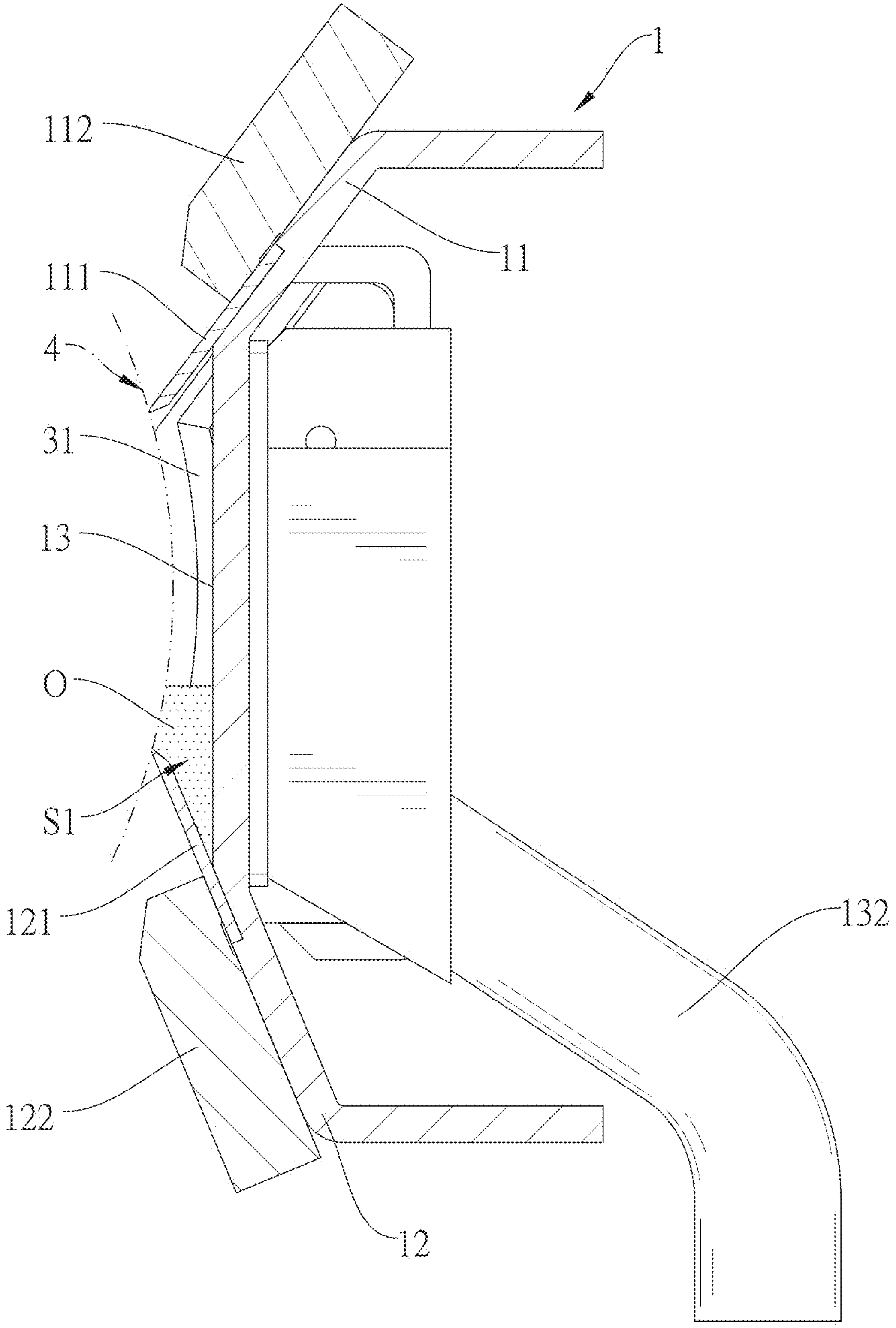
FIG. 10 is a side cross-sectional view of the ink chamber device of the second embodiment of the present invention.

Please refer to FIG. 10, the upper ink chamber frame component 11 of the ink chamber frame 1 is provided with an upper scraper 111. The upper scraper 111 is fixed to the upper ink chamber frame component 11 of the ink chamber frame 1 by means of an upper scraper holder 112 and a plurality of fixing elements. Regardless of whether the ink roller 4 rolls from the upper ink chamber frame component 11 of the ink chamber frame 1 toward the lower ink chamber frame component 12 of the ink chamber frame 1 or from the lower ink chamber frame component 12 of the ink chamber frame 1 toward the upper ink chamber frame component 11 of the ink chamber frame 1, the ink O can be evenly spread on the surface of the ink roller 4 by the scrapers.

In addition, the first ink stopper blocks and the second ink stopper blocks may be made of medium-density felt, ethylene vinyl acetate copolymer foam (EVA foam), polyethylene foam (PE foam) or ethylene propylene diene monomer rubber (EPDM), but the invention is not limited thereto. The upper scraper 111 and the lower scraper 121 can be an oblique blade, a thin blade, a round blade or a thin pointed blade, and the upper scraper 111 and the lower scraper 121 can be replaced according to usage requirements, but the invention is not limited to the above-mentioned scraper styles.

The ink chamber frame structure of the present invention can achieve the following effects:

1. It reduces the phenomenon of ink overflowing from the left and right ends of the ink shield of the ink chamber frame and the left and right ends of the ink roller.
2. It reduces ink consumption by recycling ink through the circulation device.
3. It facilitates quick replacement and reduces the labor and time cost of replacing the ink stopper blocks in the ink chamber device.

What the invention claimed is:

1. An ink chamber frame structure combined with an ink roller to form an ink chamber device with an ink return function, said ink chamber frame structure comprising:

an ink chamber frame comprising an upper ink chamber frame, a lower ink chamber frame and an ink shield formed integrally, said ink shield having an upper side thereof connected to said upper ink chamber frame component and an opposing lower side thereof connected to said lower ink chamber frame component, said ink shield having a front surface thereof disposed adjacent to said ink roller in such a manner that said ink roller has left and right ends thereof correspond to corresponding left and right ends of said ink shield;

two first ink stopper blocks disposed on the front surface of said ink shield of said ink chamber frame and respectively located near the said left and right ends of said ink shield and near the said lower side of said ink shield, said two first ink stopper blocks each having a top and an opposing bottom; and a lower scraper disposed on said lower ink chamber frame component of said ink chamber frame, said lower scraper being incorporated with said ink shield of said ink chamber frame, said two first ink stopper blocks and said ink roller to form an ink chamber;

wherein said two first ink stopper blocks are used to block an ink, and said ink chamber frame divides said ink chamber into a wiping area and two ink return areas using said two first ink stopper blocks as a dividing line, said wiping area being the area between said two first ink stopper blocks, said two ink return areas being the areas between the said left and right ends of said ink shield and said two first ink stopper blocks, said wiping area being used to accumulate an ink, the said ink accumulated in said wiping area flowing through the two tops of said two first ink stopper blocks and then flowing to said two ink return areas for recycling to avoid accumulation in the entire said ink chamber after the said ink accumulated in said wiping area exceeding the height of the two tops of said two first ink stopper blocks, so that when said ink roller is in use, the said ink is prohibited from overflowing between opposing left and right ends of said ink roller and the said left and right ends of said ink shield of said ink chamber frame.

2. The ink chamber frame structure as claimed in claim 1, wherein said ink shield of said ink chamber frame is provided with at least one ink inlet hole in said wiping area and at least one ink inlet tube connected to said at least one ink inlet hole; said ink shield of said ink chamber frame is provided with two ink return holes respectively located at said two ink return areas and two ink return tubes respectively connected to said ink return holes; said at least one ink inlet tube and said ink return tubes are both connected to a circulation device, so that after said circulation device introduces an ink into said wiping area through said at least one ink inlet tube and said at least one ink inlet hole, the excess ink flows back to said circulation device from said ink return holes and said ink return tubes in said ink return areas.

3. The ink chamber frame structure as claimed in claim 2, wherein a first distance is defined between the said two tops of said two first ink stopper blocks and the said lower side of said ink shield of said ink chamber frame, a second distance is defined between the said two bottoms of said two ink return holes and the said lower side of said ink shield of said ink chamber frame, and said second distance is smaller than said first distance.

4. The ink chamber frame structure as claimed in claim 1, wherein said ink chamber frame further comprises two first ink stopper block brackets disposed on said ink shield and respectively located near the said left and right ends of said ink shield and near the said lower side of the ink shield, and said two first ink stopper blocks are detachably engaged with said two first ink stopper block brackets.

5. The ink chamber frame structure as claimed in claim 4, wherein said two first ink stopper blocks, said lower scraper of said ink chamber frame completely fit the periphery of said ink roller, so that the ink in said wiping area is accumulated to the height of the said two tops of said two first ink stopper blocks.

6. The ink chamber frame structure as claimed in claim 4, wherein when the said two tops of said two first ink stopper blocks and respective tops of said two first ink stopper block brackets are located on the same parallel line and the said two bottoms of said two first ink stopper blocks are closely attached to the said lower side of said ink shield of said ink chamber frame, the ink in said wiping area flows over the said two tops of said two first ink stopper blocks to said two ink return areas.

7. The ink chamber frame structure as claimed in claim 4, wherein when the said two tops of said two first ink stopper blocks are parallel to or higher than respective tops of said two first ink stopper block brackets, and a gap is formed between the said two bottoms of said two first ink stopper blocks and the said lower side of said ink shield of the ink chamber frame, the ink in said wiping area flows over the said two tops of said two first ink stopper blocks and flows from the gap between the said two bottoms of said two first ink stopper blocks and the said lower side of said ink shield of the ink chamber frame to said two ink return areas, so that the ink is prohibited from being deposited at a bottom of said wiping area.

8. The ink chamber frame structure as claimed in claim 1, further comprising two second ink stopper blocks and two second ink stopper block brackets, said two second ink stopper blocks being disposed at the said left and right ends of said ink shield of said ink chamber frame, said two second ink stopper blocks fitting to respective surfaces of the said left and right ends of said ink roller to prevent the ink from overflowing from between the said left and right ends of said ink roller and said two second ink stopper blocks, said two second ink stopper block brackets being disposed on a rear surface of left and right ends of said ink chamber frame, said two second ink stopper block brackets being used to fix said two second ink stopper blocks.

9. The ink chamber frame structure as claimed in claim 1, further comprising an upper scraper, said upper scraper being disposed on said upper ink chamber frame component of said ink chamber frame.

* * * * *